(12) United States Patent
Yu et al.

(10) Patent No.: US 10,383,056 B2
(45) Date of Patent: Aug. 13, 2019

(54) LOW POWER CONSUMPTION NETWORKING METHOD OF 802.15.4E WIRELESS DEVICE THAT TAKES POWER BASED ON 4-20MA LOOP

(71) Applicants: SHENYANG INSTITUTE OF AUTOMATION OF THE CHINESE ACADEMY OF SCIENCES, Liaoning (CN); SHENYANG INSTITUTE OF AUTOMATION. GUANGZHOU. CHINESE ACADEMY OF SCIENCE, Guangdong (CN)

(72) Inventors: Haibin Yu, Liaoning (CN); Peng Zeng, Liaoning (CN); Jinchao Xiao, Liaoning (CN); Chuanzhi Zang, Liaoning (CN); Zhongwen Li, Liaoning (CN)

(73) Assignees: SHENYANG INSTITUTE OF AUTOMATION OF THE CHINESE ACADEMY OF SCIENCES, Liaoning (CN); SHENYANG INSTITUTE OF AUTOMATION, GUANGZHOU, CHINESE ACADEMY OF SCIENCE, Guangzhou, Guangdong (CN)

( * ) Notice: Subject to any disclaimer, the term of this patent is extended or adjusted under 35 U.S.C. 154(b) by 169 days.

(21) Appl. No.: 14/900,558

(22) PCT Filed: Aug. 27, 2014

(86) PCT No.: PCT/CN2014/085238
§ 371 (c)(1),
(2) Date: Dec. 21, 2015

(87) PCT Pub. No.: WO2015/085793
PCT Pub. Date: Jun. 18, 2015

(65) Prior Publication Data
US 2016/0157176 A1  Jun. 2, 2016

(30) Foreign Application Priority Data
Dec. 13, 2013  (CN) .......................... 2013 1 0690826

(51) Int. Cl.
*H04W 52/02* (2009.01)
*H04W 4/70* (2018.01)

(52) U.S. Cl.
CPC ......... *H04W 52/0225* (2013.01); *H04W 4/70* (2018.02); *Y02D 70/00* (2018.01); *Y02D 70/144* (2018.01); *Y02D 70/22* (2018.01)

(58) Field of Classification Search
CPC ... H04W 52/0225; H04W 4/005; H04W 4/70; Y02B 60/50; Y02D 70/00; Y02D 70/144; Y02D 70/22
See application file for complete search history.

(56) References Cited

U.S. PATENT DOCUMENTS

| 2006/0072694 A1* | 4/2006 | Dai | H04J 3/0667 375/354 |
| 2006/0092039 A1* | 5/2006 | Saito | G05B 19/0423 340/6.1 |

(Continued)

FOREIGN PATENT DOCUMENTS

| CN | 103262481 A | 8/2013 |
| CN | 103327572 A | 9/2013 |
| CN | 103619057 A | 3/2014 |

OTHER PUBLICATIONS

Karowski et al. (Niels Karowski et al., "Optimized Asynchronous Multi-channel Neighbor Discovery," IEEE Infocom 2011).*

(Continued)

*Primary Examiner* — Kwang B Yao
*Assistant Examiner* — Moo Jeong
(74) *Attorney, Agent, or Firm* — Smith, Gambrell & Russell, LLP

(57) ABSTRACT

Low power consumption networking method for 802.15.4e wireless device "WD" taking 4-20 mA loop power, including: a "WD" taking loop power; constructing a WD oriented to ultra-low power consumption; the WD implementing unidirectional time synchronization based on preceding wireless network; on basis of preceding time synchronization, completing neighbor discovery; the WD interacting with the wireless network; and pausing a preceding procedure according to a power monitoring result of an energy storage monitoring module. Messages are detected through continuously switching channels to implement quick and energy-saving unidirectional time synchronization, replaces (Continued)

listening on beacon frames with listening on common messages on a time synchronization basis, improves a listening sequence for neighbor discovery, enables listening only at a time slot where the beacon frames may appear and sleeps at other times, saving channel search time, and also reducing energy consumption generated in neighbor discovery, thus reducing time and energy consumption of entire network establishment.

10 Claims, 3 Drawing Sheets

(56) References Cited

U.S. PATENT DOCUMENTS

2009/0052429 A1* 2/2009 Pratt, Jr. ............... G01D 21/00
370/350

2010/0296493 A1* 11/2010 Lee ...................... H04B 1/7143
370/336
2014/0269474 A1* 9/2014 Zhu ................... H04W 52/0216
370/311

OTHER PUBLICATIONS

Watteyne et al. (T. Watteyne, Ed. Et al., "Using IEEE802.15.4e TSCH in an LLN context: Overview, Problem Statement and Goals", draft-ietf-6tisch-tsch-00).*
Niels Karowski et al. "Optimized Asynchronous Multichannel Discovery of IEEE 802.15.4-Based Wireless Personal Area Networks", IEEE Transactions on Mobile Computing, vol. 12, No. 10, Oct. 2013 (Year: 2013).*
International Search Report for PCT/CN2014/085238, dated Dec. 4, 2014 in English & Chinese Language.

* cited by examiner

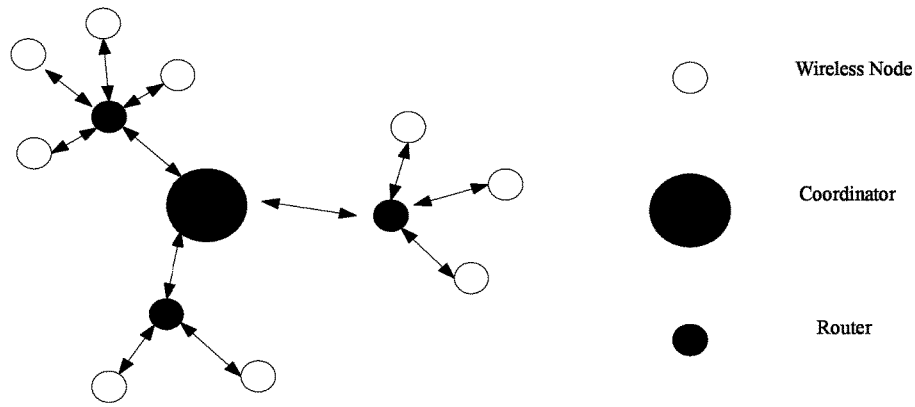
FIG. 3
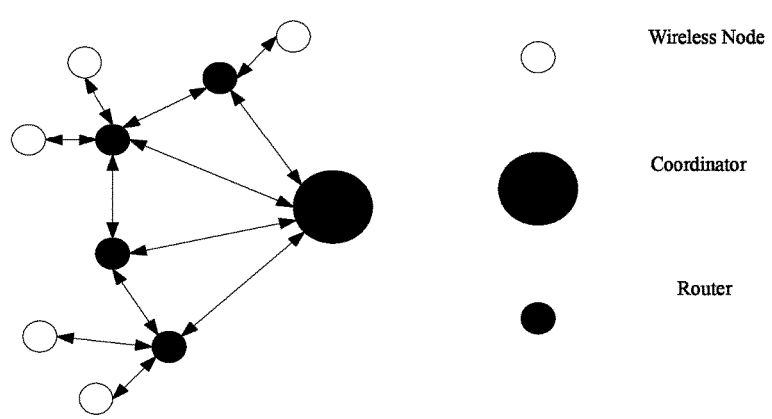
FIG. 4
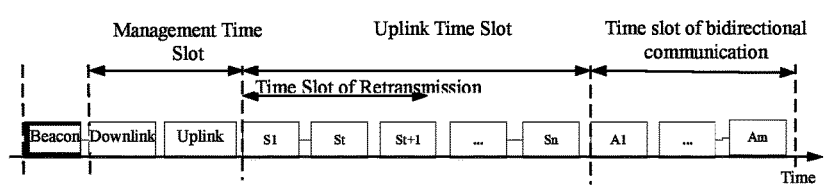
FIG. 5
| Byte: 1 | 0/1 | 0/1/5/6/10/14 | Variable-length | 2 |
|---|---|---|---|---|
| Frame Control Field | Sequence Number | Auxiliary Security Header | Frame Load | Frame Integrity Check |
| MAC Header | | | MAC Load | MAC Footer |
FIG. 6

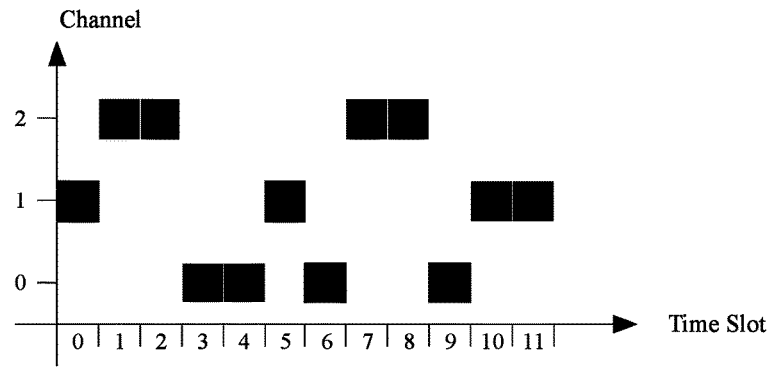

FIG. 7

Design a message listening E-OPT algorithm after the unidirectional time synchronization, select any time slot as the start point to start listening messages, and the time slots and channels to be listened to are in strict accordance with the message listening E-OPT algorithm designed;

↓

When the first message is heard, record the message type and the time taken to detect the message, record and estimate the value and range of the current absolute time slot based on whether the message includes frame count, and calculate the closest time slot T when beacon frames may appear;

↓

Allow sleep to the time slot T, listen the channels defined by the listening E-OPT algorithm in the time slot T. If no beacon frame is heard, the current time slot T is excluded and return to S2, but if a beacon frame is heard, stop listening to complete neighbor discovery.

FIG. 8

LOW POWER CONSUMPTION NETWORKING METHOD OF 802.15.4E WIRELESS DEVICE THAT TAKES POWER BASED ON 4-20MA LOOP

BACKGROUND OF THE INVENTION

Technical Field

The present invention relates to the networking technology of wireless sensor networks, and more particularly to a lower power consumption networking method of 802.15.4e wireless device that takes power based on 4-20 mA current loop.

Description of Related Art 4-20 mA current loop signal is often used in the industrial environments to realize the remote transmission of measurement data. Information in the Hart protocol communication is transmitted through such signal. The reason why such signal transmission becomes the first choice is that the signal not only is simple, convenient, anti-noise, and safe, but also can be remotely transmitted when no data is corrupted. 4-20 mA is divided into two wire system and three wire system. In the two wire system, the same cable is used for the signal transmission and the power supply so that the cable can provide power supply for wireless devices. However, these devices must consume very low power because the 4-20 mA current loop can only provide quite limited power. The minimum current is only 4 mA in the normal operation of the loop while the current may reach as low as 0 mA when there is a warning or an error. So, it is necessary to control the power consumption in the network when there is limited power obtainable in the loop to ensure that the power consumption is less than or equal to the power obtained in the unit cycle so as to maintain long-term and stable operation of wireless devices.

At present, in addition to high reliability and high real time, low power consumption is also pressing requirement for wireless devices in industrial applications. After industrial wired communication was replaced by industrial wireless communication, energy issues became the focus of attention in the practical application and the improvement of communication protocols as important measures for boosting energy efficiency. In the protocol stack of WSN, the Medium access control (MAC) layer determines the allocation and utilisation of channels and plays an important role in the energy consumption of protocol stack. For this purpose, the TG4e working group (IEEE 802,15.40e) was formally set up in 2008 in order to strengthen the support of IEEE802.15,4-2006 for wireless applications in the industrial field and TG4c to enhance and increase the functionalities of MAC.

Like other general self-organising networks, the IEEE802.15.4e network also processes time synchronization, neighbor discovery, and networking interaction. Among, them, the neighbor discovery is considered as the essence of network formation, which is the basis of the MAC protocol, router discovery, and topology management algorithm. Rapid neighbor discovery has great significance for improving network performance.

In recent years, numerous researchers focus on the development of neighbor discovery, but traditional work concentrates on carrier sense multiple access (CSMA) network which uses single channel. Owing to the mutichannel, a variety of single-channel neighbor discovery methods could not be used directly in the IEEE802.15.4e networks. One fundamental reason accounts for this point is that mutichannel increases uncertainty by directly adding another dimension of channel search in the searching space so networking involves channel searching and neighbor discovery, and this also increases the actual completion time significantly. For example, a simple and practical method from the IEEE802.15.4 network called passive neighbor discovery method PSV which turns on all available channels for neighbor discovery with the longest lasting time of each channel, but it will take a lot of time and energy in the case of the undetermined beacon interval. For reducing the ineffective searching time, the literature had successfully investigated a linear programming method to optimize the time of the neighbor discovery based on the IEEE802.15.4e network slot communication features. The literature also proposed a strategy named OPT which reduced the first, average and maximum channel searching time. However, the method only optimize the searching time without taking the energy consumption into account, and this makes it inapplicable to the energy strictly wireless sensor network. this strategy only listen the beacon frames without taking the general messages into account; in addition, the premise of the realization of the strategy is that the devices had been completed time synchronization and operated in accordance with the slot. However, in practical engineering, the new devices have not been synchronized before joining the network where no time slot exists, so the strategy cannot be directly applied in practical engineering.

BRIEF SUMMARY OF THE INVENTION

In order to overcome the disadvantages and the drawbacks in the prior technology, the present invention provides a 802.15.4e (i.e. IEEE802.15.4e) lower power consumption networking method for wireless devices based on taking power from a 4-20 mA loop.

The following technical solution is used to achieve the aim of the present invention:

A lower power consumption networking method of 802.15.4e wireless device that takes power based on a 4-20 mA loop, including the following steps:

S1. a wireless device takes power from a loop;

S2. construct a wireless network that is oriented to an ultra-low-power consumption application;

S3. the wireless device implements unidirectional time synchronization based on the preceding wireless network;

S4. on the basis of preceding time synchronization, complete neighbor discovery;

S5. the wireless device interacts with the wireless network;

Power detection will he made before entry into the next step, and if the residual power is insufficient for completing the subsequent steps, the process will be suspended and not go to the next step until sufficient power is stored.

Wherein, the wireless device takes power from a loop through the following steps:

S11. connect the wireless device to a 4-20 mA loop;

S12. the wireless device charges the storage capacitor through the power taking loop, and the charging speed depends on the current of the loop;

S13. when the voltage of the storage capacitor reaches the power that is required for completion of unidirectional time synchronization, the storage capacitor starts to supply power to the wireless transceiver module through the power supply loop;

S14. when the power consumption of the wireless transceiver module is more than the charge level of the storage capacitor, the voltage of the storage capacitor decreases. When the storage monitoring module detects that the residual power of the storage capacitor is less than the storage capacitor required for completion of neighbor discovery, the wireless transceiver module will go into sleep mode.

The wireless network is a full time slot wireless network based on the IEEE802.15.4e standard, where the coordinator transmits beacon frames and ensures that at least one beacon frame appears in a super-frame period; said super-frame includes beacon, management time slot section, upstream time slot section, and bidirectional communication time slot section, wherein:

(1) there is only one time slot in each beacon, and the coordinator sends beacon frames in this time slot;

(2) the management time slot which includes an uplink arid a downlink, mainly used for receiving and sending the management messages of the network;

(3) the upstream time slot, mainly used for retransmitting messages;

(4) bidirectional communication slot, used for receiving and sending other network messages, or response.

The unidirectional time synchronization is realized through the following methods:

S31. rapid channel search, i.e. continuously switching among the available channels to obtain messages in the network;

S32. once a message is detected, the wireless device continues with the detection until the transmission of the message is completed and records the end time;

S33. the time slot range when message transmission is started is estimated based on the end time of the message to realize the unidirectional time synchronization.

The detected message mentioned above may be one of a complete message, a part of a message, or a beacon frame; if a complete message is detected, high-precision unidirectional time synchronization can be realized; if a part of a message is detected, lower precision time synchronization is realized; if a beacon frame is detected, neighbor discovery is directly completed.

The neighbor discovery is realized through the following method:

S41. design the message monitoring algorithm after the unidirectional time synchronization, select any time slot as the starting point to begin to listen, and the time slots and channels to be listened to are in strict accordance with the message listening algorithm designed;

S42. when the first message is monitored record the message type and the time taken to detect the message, record and estimate the value and range of the current absolute time slot number $ASN_{current}$ based on whether the message includes frame count, and calculate the closest time slot T when beacon frames may appear through these information;

S43. keep dormant until the time slot T, listen to the specific channel defined by the message listening algorithm in the time slot T. If no beacon frame is detected, the current time slot T is excluded and return to S2, but if a beacon frame is detected, stop listening and complete neighbor discovery.

The design of the message listening algorithm includes the following steps:

S411. analyze neighbor discovery model of the wireless network, and obtain the conditions that have to be met to complete neighbor discovery and include: the listening time for each channel should not be less than a super-frame length; only a single channel can be searched in the same time slot; it is ensured that all possible combinations of time slots and channels should be found;

S412. calculate the probability that a message is detected at some moment and the message is the first message;

S413. assume that the time slots and channels distribution are random, optimize the time taken to detect a message to minimize the average time taken to detect a message, thereby designing a message listening sequence.

The time taken to detect a message refers to the number of time slots consumed by a wireless device from the beginning of listening to the moment when the first message is detected; the frame count of the message can be obtained only in messages with at least 5 bytes auxiliary security headers, and the value is the current absolute time slot number $ASN_{current}$. If the message does not include a frame count, estimate the range of the current absolute time slot number $ASN_{current}$, the closest time slot when the beacon frame may appear is obtained by the following formula: $T-t_{current}=ASN_{Beacon}-ASN_{current}$, where $t_{current}$ is the current time slot, $ASN_{current}$ is the current absolute time slot number, and $ASN_{Beacon}$ is the absolute time slot number of the beacon frame.

The wireless device may be a wireless adapter taking power from a 4-20 mA loop and other types of wireless devices that need to be replenished from outside; the wireless adapter comprises a power taking loop, a storage capacitor, a storage monitoring module, a microprocessor, a power supply loop and a wireless transceiver module; the power taking loop is connected with the storage capacitor and the microprocessor; the storage capacitor is connected with the storage monitoring module and the power supply loop; the storage monitoring module is connected with the microprocessor; the microprocessor is connected with the power supply loop and the wireless transceiver module; the wireless transceiver module is connected with the power supply loop and the microprocessor.

The interaction between the wireless device and the wireless network is realized through the interaction of messages: the distribution of network addresses, the distribution of network routers, and the management of security keys in the network are completed in the process of interaction.

The present invention has the following advantages and effects as compared to the prior art:

1. The balance between power taking and power consumption of a 4-20 mA loop is reached by controlling the power consumption in the networking in accordance with the present invention. Since there is such limited power obtainable in a 4-20 mA loop as not to meet the power required for continuous RF ON in the networking, it can be ensured that the average power consumption in the networking is less than the power consumption obtained from the network through appropriate dormancy to control power consumption and the function of power detection, thereby realizing uninterrupted working of the device.

2. Messages are obtained by rapid channel searching in accordance with the present invention. Since the device in the network transmits messages h time slot, if a message can be detected (even an incomplete message), the start time of the time slot can he predicted based on the end time of the message, thereby realizing unidirectional time synchronization. The average power consumption and the total power consumption in the searching are reduced in accordance with the method.

3. The position of beacon frame is predicted by listening to general messages in the network which have connections with beacon frames in accordance with the present invention. Since common messages are easy to listen for because of their large number, it takes shorter time to listen to a common message, a beacon frame can be detected through limited number of listenings, improving listening efficiency, reducing energy waste caused by blind listening, and saving a large amount of listening energy.

4. dormancy within the time slot is incorporated in accordance with the present invention, i.e. sleeping is possible after a message is detected, lengthening the sleeping time and saving listening energy. Radio Frequency is switched on and off in each time slot, so switching of channels will not cause additional energy consumption for the system.

5. Real-time power detection is made to the storage capacitor and the detection results are utilized to control the networking process in accordance with the present invention. If stored power is too low, suspend the networking and wait for the power to fill up to continue. The average power in the networking process is indirectly reduced in accordance with the method, avoiding failure of networking due to the depletion of power.

BRIEF DESCRIPTION OF THE DRAWINGS

FIG. 3 is a schematic structural view of a tree-type wireless network applicable to the present invention;

FIG. 4 is a schematic structural view of a mesh wireless network applicable to the present invention;

FIG. 5 is a schematic structural view of the super-frame of a wireless network;

FIG. 6 is a message format based on the IEEE802.15.4e standard in accordance with the present invention;

FIG. 7 is the message listening sequence designed based on the E-OPT algorithm in the embodiment of the present invention;

FIG. 8 is the flow chart of neighbor discovery in the embodiment of the present invention.

DETAILED DESCRIPTION OF THE INVENTION

The present invention will be further described in detail hereinafter with the embodiments and the drawings, but the embodiments are not intended to limit the present invention.

Embodiment a lower power consumption networking method of 802.15.4e wireless device that takes power based on 4-20 mA loop in accordance with the present invention, including the following stops:

a wireless device takes power from a loop;

construct a wireless network that is oriented to an ultra-low power consumption application;

the wireless device implements unidirectional time synchronization based on the preceding wireless network;

on the basis of the preceding time synchronization, complete neighbor discovery;

the wireless device interacts with the wireless network;

Power detection will he made before entry into the next step, and if the residual power is insufficient for completing the subsequent steps, the process will be suspended and not go to the next step until sufficient power is stored.

Figure 1:
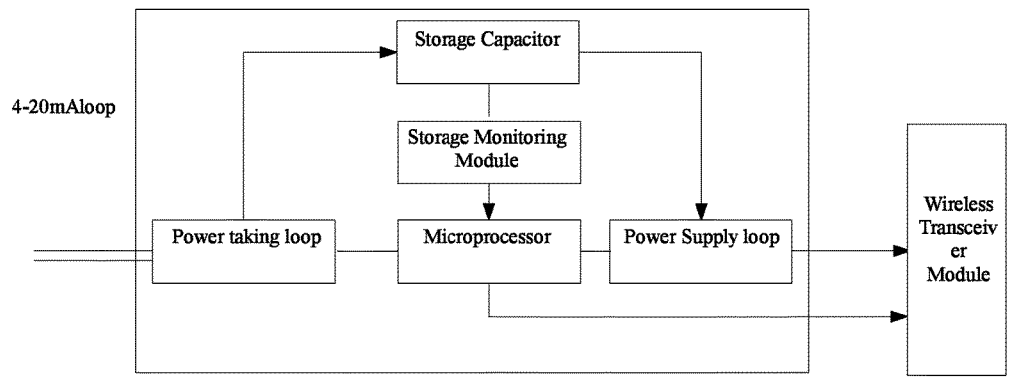
FIG. 1 is a schematic view of a wireless adapter taking power from a loop in accordance with the embodiment of the present invention.

As shown in FIG. 1, a schematic view of a wireless adapter taking power from a loop in accordance with the present invention, the wireless adapter comprises a power taking loop, a storage capacitor, a storage monitoring module, a microprocessor, a power supply loop, and a wireless transceiver module; wherein, the power taking loop is connected with the storage capacitor and the microprocessor; the storage capacitor is connected with the storage monitoring module and the power supply loop; the storage monitoring module is connected with the microprocessor; the microprocessor is connected with the power supply loop and the wireless transceiver module; the wireless transceiver module is connected with the power supply loop and the microprocessor.

After the wireless adapter is connected to a 4-20 mA loop, the microprocessor monitors the current magnitude of the power taking loop, the loop starts to charge the storage capacitor when the current of the loop is greater than 4 mA and the charging speed is dependent on the current of the loop; when the storage monitoring module detects that the voltage of the storage capacitor has reached the power that is required for completion of unidirectional time synchronization, the storage capacitor starts to supply power to the wireless transceiver module through the power supply loop; when the power consumption of the wireless transceiver module is greater than the charge level of the storage capacitor, the voltage of the storage capacitor decreases. When the storage monitoring module detects that the residual power of the storage capacitor is less than what is required for completion of neighbor discovery, the storage monitoring module transmits the monitoring results to the microprocessor which transmits them to the wireless transceiver module, and then the wireless transceiver module goes into sleep mode.

Figure 2:
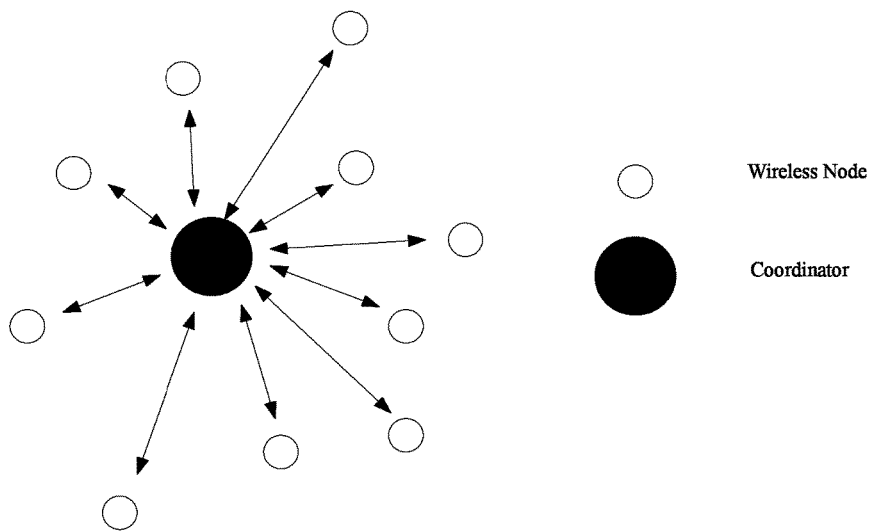
FIG. 2 is a schematic view of a star-type wireless network constructed in the embodiment of the present invention.

As shown in FIG. 2, the ultra-low power application-oriented wireless network related in the present invention is a full time slot star-type wireless network based on the IEEE802.15.4e standard, comprising two kinds of nodes: a coordinator and wireless nodes, wherein each wireless node only communicates with the coordinator. FIG. 3 and FIG. 4 are a full time slot tree-type wireless network based on the IEEE802.15.4e standard and a full time slot mesh wireless network based on the IEEE802.15.4e standard respectively, comprising three types of nodes: a coordinator, routers, and wireless nodes. Multi-channels are used for communication in the wireless network with an available channel set $C=\{c_1, c_2, \ldots, c_{max}\}$, where $|C|$ represents the number of channels in the set.

As shown in FIG. 5, the coordinator could send the beacon frame. In a super-frame period, there is only a beacon frame. The period that coordinator transmits a beacon frame is called Beacon Frame Interval which is also the super-frame length of the wireless network, expressed as BI, we have $BI=2^b \times z$, wherein b equals to beacon order, $b \in B$, $B=\{b_{min}, \ldots, b_{max}\}$, $|B|$ represents the number of elements in B and z is a constant. One super-frame includes a beacon, management time slot section, uplink time lot section, and bidirectional communication time slot section, wherein:

there is only one time slot in each beacon, and the coordinator transmits beacon frames in this time slot;

the management time slot includes an uplink and a downlink, mainly used for receiving and transmitting the management messages of the network;

the upstream, mainly used for retransmitting messages;

the time slot of bidirectional communication, used for receiving and transmission or response to other messages in the network.

The unidirectional time synchronization based on the wireless network above in accordance with the present invention is realized through the following method:

S1: rapid channel search, i.e. continuously switching among available channels to obtain messages in the network; in IEEE802.15.4e, there are 16 available channels on a 2.4G frequency band and the wireless device keeps switching among the 16 channels to detect messages, and the message format is as shown in FIG. 6;

S2: once a message is detected, the wireless device continues with the detection until the transmission of the message is completed and records the end time; the detected message may be one of a complete message, a part of a message or a beacon frame; if a complete message is detected, high-precision unidirectional time synchronization can be realized; if a part of a message is detected, lower precision time synchronization is realized; if a beacon frame is detected, neighbor discovery is directly completed.

S3: the time slot range when message transmission is started is estimated based on the end time of the message to realize the unidirectional time synchronization.

The neighbor discovery in accordance with the present invention is realized through the following method, as shown in FIG. 8:

analyze neighbor discovery model of the wireless network. Since a new wireless device is not involved in the network, and thus the link does not exist during the neighbor discovery, it is not possible to transmit messages to the outside for interaction. So, the neighbor discovery undergoes passive listening mode.

In the method of neighbor discovery based on passive listening, one time slot is occupied on some channel every time; for all $c \in C$, $i \in T$, $x_{c,t}$ describes that the listening nodes carried out one discovery on the channel c and the time slot t:

$$x_{c,t} = \begin{cases} 1, & \text{if discovery is performed listening on channel c at time slot t} \\ 0, & \text{if no discovery is performed listening on channel c at time slot t} \end{cases}$$

The following conditions have to be met when passive listening is used to complete neighbor discovery:

the listening time for each channel should not be less than a super-frame length; i.e. $\forall c \in C \; \Sigma_{t=t0}^{tmax} Xc,t \geq 2^{bmax}$;

the same time slot can only search for a single channel, i.e. $\forall t \in T \; \Sigma_{c=c0}^{cmax} Xc,t \leq 1$;

it is ensured that all possible combinations of time slots and channels should be searched, $\forall c \in C$, $\forall b \in B$, $\forall \delta \in (0, \ldots, 2^b-1) \; \Sigma_{i=c0}^{cmax} Xc, 2^b \times i + \delta \geq 1$;

Time slot and channel sequences meeting the limiting conditions above are listening sequences.

Select any time slot as the start point to start listening messages, and the time slots and channels to be listened to are completely as shown in FIG. 7.

When the first message is detected, record the message type and the time taken to detect the message, and detect whether the message includes a frame count, the frame count of the message can be obtained only in messages with at least 5 bytes auxiliary security headers and the value is the current absolute time slot number $ASN_{current}$. If the message does not include a frame count, estimate the range of the current absolute time slot number $ASN_{current}$; the absolute time slot number represents the number of time slots from the coordinator starts to work to the current time point; when the coordinator starts to work, the first beacon frame will be sent; the absolute time slot number of beacon frames and the time slot when the beacon frames are transmitted satisfy the relation: $ASN_{Beacon} \bmod 2^b = 0$, wherein b is beacon frame order in the network.

Messages type which includes beacon frames, command messages, and data messages are used to judge the distance between the current time slot and the time slot of beacon frames; in the case of beacon frames, neighbor discovery is directly completed; if the message is a command message, zero or one time slot difference exists between the command message and the beacon frame in the wireless network, i.e. $1 \leq ASN_{current} \bmod 2^b \leq 2$; if the message is the data message, data message exist in broader location and the time slot does not coincide with that of the beacon frames located in, i.e. $ASN_{current} \bmod 2^b \neq 0$; the range of b can he narrowed and optimized based on the message type.

After monitoring the first message, high-precision unidirectional time synchronization of the wireless device can be realized at the same time.

The time taken to detect a message refers to the number of time slots consumed by a wireless device from the beginning of listening to the moment when the first message is detected, which can be used to narrow the range of b, i.e. to exclude the values of b satisfying the relation $2^b > t1$.

Therefore, the range of the beacon frame order b can be estimated based on the message type, the time taken to detect a message, and the current absolute time slot number. A closest time slot T when the beacon frames may appear is estimated based on the minimum b in the range of the beacon frame order b: $T - t_{current} = ASN_{beacon} - ASN_{current}$, where $t_{current}$ is the current time slot $ASN_{current}$ is the current absolute time slot number, and $ASN_{Beacon}$ is the absolute time slot number of the beacon frame; keep dormancy to the time slot T, reducing power consumption, and listen the channels defined E-OPT in the time slot T. If no beacon is detected, the current b is excluded to make a more precise prediction; if a beacon is detected, stop listening, complete neighbor discovery.

After the completion of neighbor discovery, an access request is sent to the neighbor. After the access request reaches the coordinator and the validation is completed, the interaction stage of access begins. The distribution of network addresses, the distribution of network routers, and the management of security keys in the network are completed in the process of interaction. The wireless device begins to work after the completion of access interaction to complete the access.

The embodiments above are the preferred embodiments of the present invention, but not intended to limit the present invention. Any changes, modifications, alternations, combinations and simplifications made without deviation from the spirit and principle of the present invention shall be equivalent replacements and fall in the protection scope of the present invention.

What is claimed is:

1. A networking method, comprising:
   S1. receiving power at a 802.15.4e wireless device from a 4-20 mA loop;
   S2. orienting a wireless network to an ultra-low-power consumption application;
   S3. implementing, at the wireless device, unidirectional time synchronization based on the wireless network;
   S4. performing neighbor discovery based on the unidirectional time synchronization; and
   S5. the wireless device interacting with the wireless network,
   wherein a power detection is made before entry into a next step, and if it is determined that residual power is insufficient for completing the next step, processing is suspended and does not go to the next step until a determination is made that sufficient power is available, wherein, in step S1, the wireless device receives power from the 4-20 mA loop in accordance with the following steps:
- S11. the wireless device is connected with the 4-20 mA loop;
- S12. the wireless device charges a storage capacitor through a power taking loop;
- S13. when a voltage of the storage capacitor reaches a level that is required for completion of unidirectional time synchronization, the storage capacitor starts to supply power to a wireless transceiver module through a power supply loop;
- S14. when a storage monitoring module detects that the voltage of the storage capacitor is less than is required for completion of neighbor discovery, the wireless transceiver module enters a sleeping mode until the storage capacitor reaches a sufficient voltage for completion of neighbor discovery, wherein, in step S3, the unidirectional time synchronization comprises:
- S31. rapid channel searching to continuously switch among available channels to obtain messages in the wireless network;
- S32. once a message is detected, the wireless device continues detection until transmission of the message is completed, and an end time of the transmission is then recorded;
- S33. a time slot range when message transmission is started is estimated based on the end time of the transmission, and wherein in step S4, neighbor discovery comprises:
- S41. selecting a time slot as a starting point to begin monitoring time slots and channels in accordance with a message monitoring algorithm;
- S42. when a first message is monitored, recording a message type and a time taken to detect the first message, recording and estimating a value and range of a current absolute time slot number $ASN_{current}$ based on whether the first message includes a frame count, and calculating a closest time slot T when beacon frames may appear based on the current absolute time slot number $ASN_{current}$ and the time taken to detect the first message; and
- S43. the wireless transceiver module remaining in a sleeping mode until the time slot T, and then monitoring channels defined by the message monitoring algorithm in the time slot T; wherein, if no beacon frame is detected, excluding the time slot T as a time slot when beacon frames may appear and returning to step S2, and if a beacon frame is detected, stopping monitoring and completing neighbor discovery.

2. The networking method of claim 1, wherein in step S2, the wireless network is a full time slot wireless network based on the IEEE802.15.4e standard, and a coordinator transmits beacon frames and ensures that at least one beacon frame appears in a super-frame period; and said super-frame includes a beacon, a management time slot section, an upstream time slot section, and a bidirectional communication time slot section, wherein:
(1) there is only one time slot in each beacon, and the coordinator sends beacon frames in that one time slot;
(2) the management time slot section includes an uplink and a downlink for receiving and sending messages of the network;
(3) the upstream time slot section is for retransmitting messages; and
(4) the bidirectional communication time slot section is for receiving and sending further network messages or responses.

3. The networking method of claim 1, wherein in step S32, the detected message is one of a complete message, a part of a message and/or a beacon frame; wherein
if a complete message is detected, high-precision unidirectional time synchronization is realized;
if a part of a message is detected, lower precision unidirectional time synchronization is realized; and
if a beacon frame is detected, neighbor discovery is completed.

4. A networking method comprising:
S1. receiving power at a 802.15.4e wireless device from a 4-20 mA loop;
S2. orienting a wireless network to an ultra-low-power consumption application;
S3. implementing, at the wireless device, unidirectional time synchronization based on the wireless network;
S4. performing neighbor discovery based on the unidirectional time synchronization; and
S5. the wireless device interacting with the wireless network, wherein a power detection is made before entry into a next step, and if it is determined that residual power is insufficient for completing the next step, processing is suspended and does not go to the next step until a determination is made that sufficient power is available, wherein in step S4, neighbor discovery comprises:
- S41. selecting a time slot as a starting point to begin monitoring time slots and channels in accordance with a message monitoring algorithm;
- S42. when a first message is monitored, recording a message type and a time taken to detect the first message, recording and estimating a value and range of a current absolute time slot number $ASN_{current}$ based on whether the first message includes a frame count, and calculating a closest time slot T when beacon frames may appear based on the current absolute time slot number $ASN_{current}$ and the time taken to detect the first message; and
- S43. the wireless transceiver module remaining in a sleeping mode until the time slot T, and then monitoring channels defined by the message monitoring algorithm in the time slot T; wherein, if no beacon frame is detected, excluding the time slot T as a time slot when beacon frames may appear and returning to step S2, and if a beacon frame is detected, stopping monitoring and completing neighbor discovery.

5. The networking method of claim 4, wherein in step S41, monitoring in accordance with the message monitoring algorithm comprises:
- S411. monitoring only a single channel for each time slot; a monitoring time for each channel being not less than a super-frame length; and monitoring all possible combinations of time slots and channels;
- S412. calculating a probability that a message is detected at some moment and that the detected message is a first message; and S413. if monitoring a randomized distribution of time slots and channels, optimizing the time taken to detect a message to minimize an average time taken to detect a message.

6. The networking method of claim 4, wherein, in step S42,
the time taken to detect a message refers to a number of time slots consumed by the wireless device from a beginning of monitoring to a moment when the first message is detected;
a frame count of a message is obtained only in messages with at least 5 bytes auxiliary security headers, and a value of the frame count is the current absolute time slot number $ASN_{current}$;
if a message does not include a frame count, a range of the current absolute time slot number $ASN_{current}$ is estimated; and
the closest time slot T when the beacon frame may appear is obtained by a formula: $T-t_{current}=ASN_{Beacon}-ASN_{current}$, where $t_{current}$ is a current time slot, $ASN_{current}$ is a current absolute time slot number, and $ASN_{Beacon}$ is an absolute time slot number of the beacon frame.

7. The networking method of claim 1, wherein
the wireless device comprises the power taking loop, the storage capacitor, the storage monitoring module, a microprocessor, the power supply loop, and the wireless transceiver module;
the power taking loop is connected with the storage capacitor and the microprocessor;
the storage capacitor is connected with the storage monitoring module and the power supply loop;
the storage monitoring module is connected with the microprocessor;
the microprocessor is connected with the power supply loop and the wireless transceiver module; and
the wireless transceiver module is connected with the power supply loop and the microprocessor.

8. The networking method of claim 7, wherein the wireless device is a wireless adapter.

9. The networking method of claim 1, wherein
in step S5, interaction of the wireless device with the wireless network comprises distribution of network addresses, distribution of network routers, and management of security keys in the wireless network.

10. A networking method comprising:
S1. receiving power at a 802.15.4e wireless device from a 4-20 mA loop;
S2. orienting a wireless network to an ultra-low-power consumption application;
S3. implementing, at the wireless device, unidirectional time synchronization based on the wireless network;
S4. performing neighbor discovery based on the unidirectional time synchronization; and
S5. the wireless device interacting with the wireless network,
wherein a power detection is made before entry into a next step, and if it is determined that residual power is insufficient for completing the next step, processing is suspended and does not go to the next step until a determination is made that sufficient power is available,
wherein in step S4, neighbor discovery comprises:
selecting a time slot as a starting point to begin monitoring time slots and channels in accordance with a message monitoring algorithm;
when a first message is monitored, recording a message type and a time taken to detect the first message, recording and estimating a value and range of a current absolute time slot number $ASN_{current}$ based on whether the first message includes a frame count, and calculating a closest time slot T when beacon frames may appear based on the current absolute time slot number $ASN_{current}$ and the time taken to detect the first message; and
a wireless transceiver module of the wireless device remaining in a sleeping mode until the time slot T, and then monitoring channels defined by the message monitoring algorithm in the time slot T;
wherein the closest time slot T when a beacon frame may appear is obtained by a formula: $T-t_{current}=ASN_{Beacon}-ASN_{current}$, where $t_{current}$ is a current time slot, $ASN_{current}$ is a current absolute time slot number, and $ASN_{Beacon}$ is an absolute time slot number of the beacon frame.

* * * * *